Feb. 13, 1962 G. BALLIN 3,020,938
LIQUID DROPPER ASSEMBLY WITH METERING MEANS
Filed Sept. 8, 1959
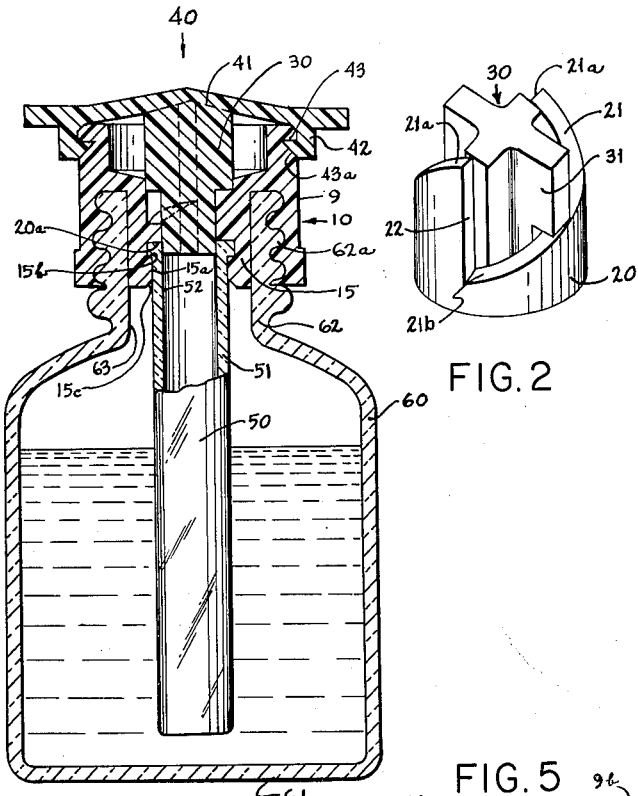
FIG. 2
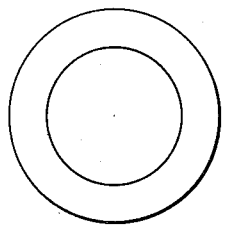
FIG. 3
FIG. 1
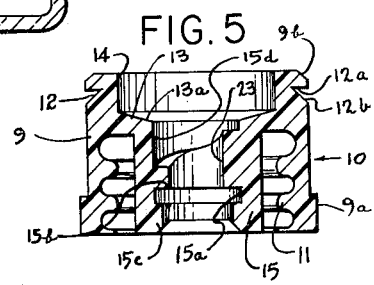
FIG. 5
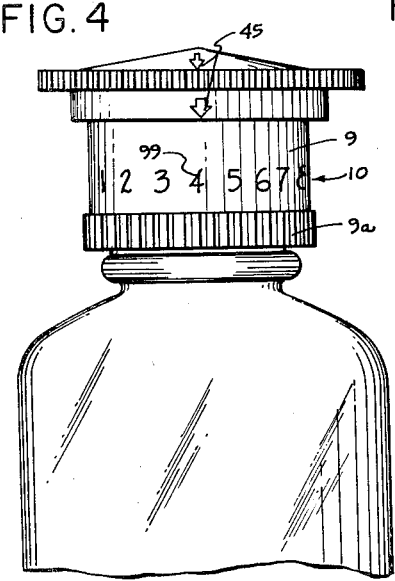
FIG. 4
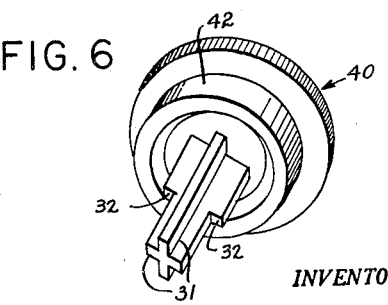
FIG. 6
INVENTOR.
GENE BALLIN
BY Blum, Moscovitz,
Friedman & Blum
Attorneys

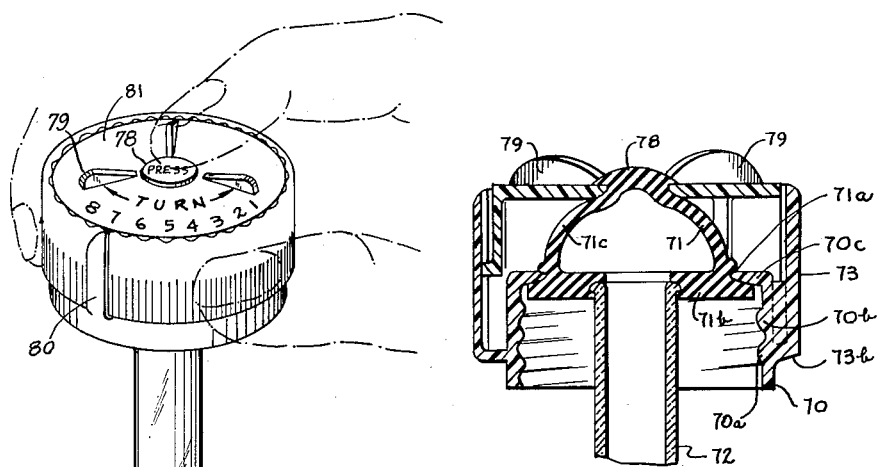
FIG. 8
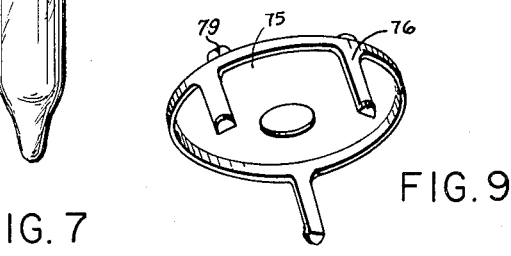
FIG. 9
FIG. 7
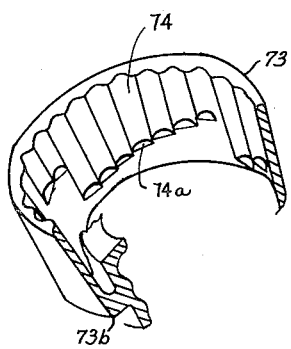
FIG. 10
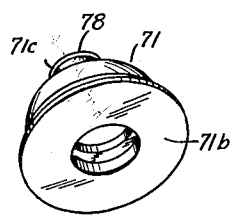
FIG. 11
INVENTOR.
GENE BALLIN

United States Patent Office 3,020,938
Patented Feb. 13, 1962

3,020,938
LIQUID DROPPER ASSEMBLY WITH METERING MEANS
Gene Ballin, Valley Stream, N.Y., assignor to Dosamatic Dropper Corporation, Valley Stream, N.Y., a corporation of New York
Filed Sept. 8, 1959, Ser. No. 838,678
10 Claims. (Cl. 141—24)

This invention relates to improvements in liquid droppers of the type commonly used in dispensing liquid medicines and in other applications.

In many common liquid medicine packages and similar packages in common use, there is incorporated in the cap of the container an elongated tube, known as a dropper, which extends into the liquid and which has a squeeze bulb on its upper end, the object being to squeeze the bulb and then release it so as to draw liquid into the tube prior to removing the cap from the bottle, and then to squeeze the bulb again so as to eject the liquid from the tube.

Frequently, the directions call for a specified number of drops of the liquid to be dispensed, and in some instances the tube is graduated so as to indicate the number of drops of liquid which have been drawn into the tube. In practice, it is extremely difficult to regulate the number of drops of liquid which are drawn into the tube, and the number of drops of liquid which are thereby dispensed.

An important object of this invention is to provide an improved dropper of the type generally described above, and incorporating precise metering and indicating means which are variable at will so as to predetermine the number of drops of liquid which can be drawn into the tube of the medicine dropper, or ejected from the dropper.

Another important object of this invention is to provide a liquid dropper of the type generally described above, and incorporating metering means for predetermining the number of drops which can be drawn into the dropper, it being possible to draw the desired number of drops into the tube of the medicine dropper, regardless of the pressure which is exerted upon the squeeze bulb, so long as this pressure exceeds a predetermined minimum value.

Another important object of this invention is to provide an improved liquid dropper of the above described type, which is sanitary and simple in construction and operation.

Other objects and advantages of this invention will become apparent from the following description, in conjunction with the annexed drawings, in which preferred embodiments of the invention are disclosed.

In the drawings, a first embodiment of the invention is shown in FIGURES 1-6.

FIG. 1 is a vertical section of the liquid dropper assembly in accordance with said first embodiment, showing the liquid dropper assembly mounted upon a bottle.

FIG. 2 is a fragmentary perspective view of a portion of the medicine dropper assembly, comprising the piston or plunger and the guide therefor.

FIG. 3 is a top plan view of the liquid dropper assembly.

FIG. 4 is a front elevation of the liquid dropper assembly, mounted upon the bottle of FIG. 1.

FIG. 5 is a fragmentary detail view, similar to FIG. 1, of the cap and guide of the dropper assembly.

FIG. 6 is a bottom perspective view of the piston or plunger and head of the liquid dropper assembly.

FIGS. 7–11 show a second embodiment of the invention.

FIG. 7 is a perspective view of the dropper assembly.

FIG. 8 is a vertical section, partly broken away, of the assembly.

FIG. 9 is a bottom perspective view of the plunger.

FIG. 10 is a perspective view, partly broken away, of the cap.

FIG. 11 is a perspective view of the compression bulb of the assembly.

First embodiment

Upon reference to the drawings in detail, it will be noted that they show a liquid dropper assembly consisting generally of cap 10, guide 20, piston or plunger 30, head 40 and tube 50, this dropper assembly being adapted to be mounted upon bottle 60. As will be explained in detail below, cap 10 and guide 20 are either molded in one piece or are secured together with cap 10 being adapted to be screwed onto the outside of the neck of bottle 60, and with guide 20 adapted to be received inside the neck of bottle 60. Head 40 and plunger 30 are also either molded in one piece or are secured together permanently, with resilient head 40 adapted to be secured over the top of cap 10 and with plunger 30 extending into guide 20. Tube 50 is adapted to be fixed to the lower end of guide 20, with plunger 30 being reciprocable and turnable within guide 20 and also within tube 50. As will also be explained in detail below, by adjusting the turned position of head 40, and hence of plunger 30, it is possible to adjust the extent to which plunger 30 may be depressed within guide 20 and tube 50. This determines the amount of liquid which is drawn into tube 50 when resilient head 40 is released and returns to its upper position.

Said bottle 60 and cap 10 may be of any suitable interfitting shape. Optionally, and without limitation thereto, bottle 60 is of cylindrical shape with the usual bottom wall 61 and with a neck 62 of decreased diameter. Said neck 62 has an interior through bore 63 which is optionally cylindrical. Optionally, said neck 62 has the usual external screw thread 62a. For convenience of description, but without limitation thereto, bottle 60 and the liquid dropper assembly in accordance with this invention will be described with reference to the position thereof of FIG. 1, which will be assumed to be the upright vertical position of the assembly.

Cap 10 is shown in detail in FIGS. 1 and 5, and is also shown in FIG. 4. Said cap 10 preferably has a cylindrical peripheral wall 9 with an internal screw thread 11 extending to the bottom open end thereof. Optionally, the outer lower portion 9a of the peripheral wall 9 of cap 10 is of slightly enlarged external diameter and is knurled. The upper end of cap peripheral wall 9 is chamfered, as indicated by the reference numeral 9b, or in other words is beveled downwardly and outwardly, starting at the upper end of cap 10.

Just below the chamfer or bevel 9b, an external peripheral groove 12 is formed in cap peripheral wall 9. This groove 12 has an upper surface 12a which is transverse to the vertical axis of the assembly and which is annular. A bevel surface 12b of groove 12 extends downwardly and outwardly from the inner edge of surface 12a, and extends to the outer periphery of the cap peripheral wall.

Slightly below the level of groove 12, an internal, transverse, annular flange 13 is formed on cap peripheral wall 9. This flange 13 defines a cylindrical recess 14 in the upper end of cap 10. Optionally, the upper face 13a of flange 13 is cut away or beveled so as to be somewhat disc-shaped.

Cap 10 also includes a cylindrical sleeve 15 which is integral at its upper end with flange 13 and which extends downwardly therefrom. Said cylindrical sleeve 15 is coaxial with the peripheral wall of cap 10. In assembly, when cap 10 is screwed onto the outer face of neck 62, with screw threads 11 and 62a meshing, sleeve 15 extends frictionally and turnably into neck bore 63.

Cap wall 9, sleeve 15 and flange 13 are optionally and preferably molded in one piece. While in FIGS. 1 and 2, guide 20 is shown as integral with sleeve 15, this is for convenience of illustration; and it will be apparent from FIG. 2 that guide 20 may optionally be fabricated separately from sleeve 15, and may be fixed to sleeve 15 by any suitable means.

Said guide 20 is of general cylindrical shape and extends in bore 15d of sleeve 15 from the level of the bottom face of flange 13 to approximately the mid-point of sleeve 15. The bottom end surface of guide 20 is annular and is transverse to the axis of the assembly. Somewhat below the lower end surface 20a of guide 20, the bore 15d of sleeve 15 is of reduced diameter, as indicated by the reference numeral 15a, to define an annular shoulder 15b which faces and is spaced from the guide end surface 20a.

Sleeve 15 is preferably beveled or chamfered as designated by the reference numeral 15c, at the lower end of bore 15d.

Cap 10 is made of material which is relatively rigid, but which is such that sleeve 15 is somewhat flexible and resilient.

Tube 50 is of hollow cylindrical shape and has an annular head 51 of enlarged external diameter. Tube 50 is extended frictionally upwardly through the lower end of sleeve bore 15d (this being aided by bevel 15c and by the flexibility of sleeve 15), and into abutment with guide end surface 20a, with head 51 extending frictionally into the space between surface 20a and shoulder 15b and bounded peripherally by sleeve bore portion 15d. Optionally, tube 50 may be molded integrally with sleeve 15.

When cap 10 is screwed onto neck 62, tube 50 extends to a point slightly above bottom wall 61 of container 60. The bore 52 of tube 50 is of the same diameter as and axially aligned with bore 23 of guide 20.

When cap 10 is screwed onto neck 62, flange 13 overlies the lip of neck 62. Optionally, any suitable annular gasket may be provided between flange 13 and the lip of neck 62, such gasket being conventional and being omitted in the drawing.

As an important feature of the invention, the upper end of guide 20 is provided with two cut-outs to define helical upper ramp edges 21 of guide 20. Said ramp edges 21 have respective upper ends 21a which are at the upper end of guide 20 and which are diametrically opposed. The lower end of one edge 21, designated by the reference numeral 21b, is located in vertical alignment with end 21a of the other edge 21, or in other words the two respective ends 21a and 21b of respective edges 21 are connected by an edge 22 which extends vertically or in a direction parallel to the central vertical axis of the assembly.

Head 40 is flexible and resilient and of discshape with a central raised portion 41. Head 40 has a depending cylindrical flange 42 located inwardly of the periphery thereof. Flange 42 has an inturned bottom annular peripheral flange 43 with beveled lower surface 43a. Flange 43 extends frictionally turnably into the correspondingly shaped external annular peripheral groove 12 which has been previously described.

Plunger 30 depends from head central portion 41 and into bore 15d. Plunger 30 is generally cylindrical but has four longitudinal cut-outs 31 for drainage of liquid from the space above flange 13 to tube 50. Plunger 30 has a pair of radially protruding extensions 32 which respectively are aligned with ramp edges 21.

It will be apparent that the turned position of head 41 (and corresponding turned position of plunger extensions 32) determines the extent to which plunger 30 may be extended into tube 50 (until extension 32 strikes ramp edges 21). This in turn determines the amount of liquid drawn into tube 50 when head 40 is released and it returns to its normal position. Furthermore, the charge which can be drawn into tube 50 is independent of the amount of force exerted on head 40, as long as the force is sufficient to lower plunger extensions 32 into engagement with ramp edges 21.

Arrow 45 on head 40 cooperates with calibrated numerical scale 99 on wall 9 to determine the turned position of head 40, the number to which arrow 45 points indicating the number of drops which can be drawn into tube 50.

*Second embodiment*

This works on the same principle as the first embodiment.

The assembly includes cap 70 with integral screw thread 70a on its peripheral wall 70b and with apertured top wall 70c. Dome-shaped squeeze bulb 71 is received within the aperture of wall 70c with wall 70c snapped into peripheral groove 71a of bulb 71. Bulb 71 has an apertured bottom wall 71b in which dropper 72 is received.

In this embodiment, the guide 73 is external to and of greater diameter than cap 70. Guide 73 is cylindrical and has an inturned bottom annular peripheral flange 73b which connects with the peripheral wall of cap 70 slightly above the bottom end thereof. Guide 73 has circumferentially successive, longitudinally extending grooves 74 in its inner face and extending downwardly from its top edge. There are three sets of grooves 74, with the lower ends 74a of the grooves of each set being of graduated height, so that a line connecting said groove ends 74a would be of helical contour. The short groove of each set is succeeded by the long groove of the next set.

Plunger 75 is of disc-shape with three equally spaced, resilient fingers 76 extending downwardly from the periphery thereof. Plunger 75 has an aperture so that it is received within peripheral groove 71c at the top of bulb 71. Plunger 75 is vertically slidably received within guide 73, with fingers 76 respectively slidably received within respective grooves 74, of the same height, of a respective set. Plunger 75 may be rotated so as to snap fingers 76 into different grooves 74.

It will be apparent that the turned position of plunger 75 determines the extent to which it can be depressed, and hence determines the amount of liquid charge received within tube 72 when plunger 75 is released and bulb 71 returns it to its normal position.

Instead of pressing plunger 75, the bulb tip 78 above plunger 75 (marked "Press") may be pressed downwardly.

Vertical ribs 79 on the top of plunger 75 facilitate turning it. Pointer 80 on the outside of guide 73 cooperates with calibrated peripheral scale 81 (illustratively numbered from 1 to 8) on the top of plunger 75, the number on scale 81 which pointer 80 faces indicating the number of drops of liquid which can be drawn into tube 72.

Preferably, the number of grooves 74 of each set of grooves are correlated to the numbers on scale 81. Thus, if it is desired to vary the dosage between 1 and 8 drops, there can be eight grooves 74 of each set, corresponding to eight numbers on scale 81. In addition, scale 81 is oriented, and the grooves are so spaced, that pointer 80 is positioned facing each of the numbers on scale 81 in correspondence with location of finger 76 in each of the grooves of the set and corresponds with respective grooves 74 of a set of grooves. Grooves 74 may vary in number from one up, according to the number of varied quantities of doses required for a particular use.

In each embodiment, there is provided a liquid dropper assembly comprising a cap for bottles and the like having an axially extending tube thereon. An axially movable compression member on the end wall of the tube cooperates with the bore of the tube to define a compression chamber for use in moving liquid into and out of the tube. In each embodiment, a first member or plunger is coupled to the compression member for axial movement in unison therewith, and a stop member is fixed in the path of compressive movement of the compression member so as to limit such movement and thereby meter the amount of liquid which can be received by the tube and which can be delivered from the tube for the desired use of the liquid.

In the first embodiment, the first member or plunger is a radially flanged axial shank on the compression member which can slide in the tube. The stop member is a cutaway or curved end surface on a guide sleeve in which the shank slides, with the flange opposing the cut-away end surface. The compression member can be turned, thereby varying the spacing between the flange and the cut-away sleeve end surface, so as to vary the extent of movement of the compression member and the amount of liquid which can be drawn into the tube.

In the second embodiment, the first member or plunger is an annular disc externally turnably mounted on the compression member. The stop member is a guide sleeve surrounding the cap and shaped to receive fingers projecting from the disc. The sleeve is cut away to define a curved end surface and an outer peripheral guide surface against which the fingers can slide into abutment with the curved end surface. By turning the disc, the spacing between the fingers and the end surface can be varied, to the same effect as in the case of the first embodiment.

While I have disclosed preferred embodiments of my invention and have indicated various changes, omissions and additions which can be made therein, it will be apparent that various other changes, omissions and additions may be made in the invention without departing from the scope and spirit thereof.

I claim:

1. A liquid dropper assembly comprising a cap for bottles and the like having an outer end with at least a partial central opening and a peripheral wall which has an axis, a resilient compression member mounted on said end over and completely enclosing said opening and having a portion movable substantially only axially and biased to normal outer position, said cap and compression member forming an airtight compression chamber, an axially extending tube, means mounting said tube on said cap with the bore of said tube in airtight communication with said compression chamber, a plunger entirely within said chamber fixed to said compression member portion on the interior side thereof and axially movable in unison therewith, a guide member mounted on said cap and positioned and shaped to receive said plunger axially slidably, and stop means for engaging said guide member with said plunger to limit inward movement of said compression member portion.

2. A liquid dropper assembly comprising a cap for bottles and the like having an outer end with at least a partial central opening and a peripheral wall which has an axis, a resilient compression member mounted on said end over and completely enclosing said opening and having an axially movable portion biased to normal outer position, said cap and compression member forming an airtight compression chamber, an axially extending tube, means mounting said tube on said cap with the bore of said tube in airtight communication with said compression chamber, a plunger fixed to said compression member portion on the interior side thereof and axially movable in unison therewith, a guide member mounted on said cap and positioned and shaped to receive said plunger axially slidably, and stop means for engaging said guide member with said plunger to limit inward movement of said compression member portion, said guide member being a sleeve located radially inwardly of said cap peripheral wall and having an outer end edge, said plunger extending axially inwardly and centrally from said compression member and shaped to extend slidably into said sleeve, said compression member being turnable about said axis, said plunger having at least one radially outwardly extending projection which opposes said sleeve end edge and which is normally spaced therefrom, said projection and said sleeve end edge being cooperatively shaped to vary the distance therebetween depending upon the turned position of said compression member.

3. A metering cap for a liquid dropper assembly comprising a first piece having a peripheral wall and with an opening at one end, a second piece mounted on said first piece and having a resilient continuous wall completely enclosing and sealing said opening to form a compression chamber, said wall having a portion movable substantially only axially, one of said pieces having a plunger integrally formed thereon within said chamber, the other of said pieces having an integral guide member mounted coaxially with respect to said peripheral wall and positioned and shaped to receive said plunger, said plunger and guide member being axially slidable relative to one another upon deflection of said resilient wall, and said guide member including stop means for engagement with said plunger to limit inward movement of said resilient wall.

4. A metering liquid dropper assembly comprising a first piece having a peripheral wall and with an opening at one end, a second piece rotatably mounted on said first piece and having a resilient continuous wall enclosing and sealing said opening, one of said pieces having a plunger integrally formed thereon, the other of said pieces having an integral guide member mounted coaxially with respect to said peripheral wall and positioned and adapted to receive said plunger, said plunger and guide member being axially slidable relative to one another upon deflection of said resilient wall, said guide member including stop means for engagement with said plunger to limit inward movement of said resilient wall, said stop means being at different distances from said plunger for different relative rotational positions of said pieces.

5. A metering cap for a liquid dropper assembly comprising a first piece having a peripheral wall and with an opening at one end, a second piece mounted on said first piece and having a resilient continuous wall completely enclosing and sealing said opening, one of said pieces having a plunger integrally formed thereon, the other of said pieces having an integral guide member mounted coaxially with respect to said peripheral wall and positioned and shaped to receive said plunger, said plunger and guide member being axially slidable relative to one another upon deflection of said resilient wall, and said guide member including stop means for engagement with said plunger to limit inward movement of said resilient wall, said guide member including a sleeve coaxial with said peripheral wall and said plunger having a shank slidably receivable within said sleeve, said sleeve having an end with portions of differing distance from said plunger, and said plunger shank having a projection extending radially outward therefrom and opposing said sleeve end.

6. A metering cap for a liquid dropper assembly comprising a first piece having a peripheral wall and with an opening at one end, a second piece mounted on said first piece and having a resilient continuous wall completely enclosing and sealing said opening, one of said pieces having a plunger integrally formed thereon, the other of said pieces having an integral guide member mounted coaxially with respect to said peripheral wall and positioned and shaped to receive said plunger, said plunger and guide member being axially slidable relative to one another upon deflection of said resilient wall, and said guide member including stop means for engagement with said plunger to limit inward movement of said resilient wall, said guide member including a sleeve coaxial with said peripheral wall, and said plunger having a shank slidably receivable within said sleeve, said sleeve having an end with a substantially helical edge portion, and said plunger shank having a projection extending radially outward therefrom and opposing said sleeve end edge portion to engage therewith upon relative axial movement of said plunger and sleeve.

7. A metering cap for a liquid dropper assembly comprising a first piece having a peripheral wall with an axis and with an opening at one end, a second piece mounted on said first piece and having a resilient continuous wall completely enclosing and sealing said opening to form a compression chamber, said wall having a portion movable substantially only axially, one of said pieces having a plunger integrally formed thereon within said chamber, the other of said pieces having an integral guide member mounted parallel to the axis of said peripheral wall and positioned and shaped to receive said plunger, said plunger and guide member being axially slidable relative to one another upon deflection of said resilient wall, and said guide member including stop means for engagement with said plunger to limit inward movement of said resilient wall.

8. A liquid dropper assembly comprising a first piece having an outer end with an opening and a peripheral wall which has an axis, a resilient compression member rotatably mounted on said end over said opening and having an axially movable portion biased to normal outer position, said first piece and compression member forming an air-tight compression chamber, an axially extending tube, means mounting said tube on said first piece with the bore of said tube in air-tight communication with said compression chamber, a plunger fixed to said axially movable compression member portion on the interior side thereof and axially movable in unison therewith, and a guide member mounted on said first piece and positioned and shaped to receive said plunger axially slidably, said guide member being a sleeve having an outer end edge shaped as a substantially helically curved surface, said plunger being shaped to extend slidably into said sleeve and having at least one radially outwardly extending projection which opposes said sleeve and edge and which is cooperatively shaped for coacting therewith, said projection being normally spaced from said sleeve end edge, whereby said projection engages said sleeve and edge upon relative axial movement of said plunger and sleeve for limiting inward movement of said compression member depending upon the turned position of said compression member.

9. A metering device comprising a first piece having a peripheral wall and with an opening at one end, a second piece mounted on said first piece and having a resilient continuous wall portion movable axially relative to the remainder of said second piece, said second piece completely enclosing and sealing said opening, one of said pieces having a plunger integrally formed thereon, the other of said pieces having a stop element integrally formed thereon and positioned and shaped to receive said plunger, said stop element having an end surface with portions of differing distances with respect to said plunger and individually and selectively engageable with said plunger to adjustably limit the advance of said plunger with respect to said stop element.

10. A metering device comprising a first piece having a peripheral wall and with an opening at one end, a second piece mounted on said first piece and having a resilient continuous wall portion movable axially relative to the remainder of said second piece, said second piece enclosing and sealing said opening, first and second cooperable stop members carried respectively by said first and second pieces for limiting the advance of said resilient wall, one of said stop members having an end surface with portions of differing distances with respect to said other stop member and individually and selectively engageable with said other stop member for adjustably determining the movement of said resilient wall.

References Cited in the file of this patent

UNITED STATES PATENTS

| 644,703 | Buckley | Mar. 6, 1900 |
| 2,428,577 | Mathis | Oct. 7, 1947 |
| 2,805,798 | Sampson | Sept. 10, 1957 |